United States Patent [19]
Potter

[11] Patent Number: 6,036,854
[45] Date of Patent: Mar. 14, 2000

[54] SYSTEM FOR WASTE WATER TREATMENT

[75] Inventor: J. Leon Potter, Katy, Tex.

[73] Assignee: Shane-Agra Corporation, Columbus, Ohio

[21] Appl. No.: 08/999,530

[22] Filed: Dec. 23, 1997

Related U.S. Application Data

[62] Division of application No. 08/603,042, Feb. 16, 1996, Pat. No. 5,707,524.

[51] Int. Cl.⁷ .................................. C02F 3/32; C02F 1/02
[52] U.S. Cl. ....................... 210/177; 210/181; 210/195.1; 210/202; 210/257.1
[58] Field of Search .................................... 210/177, 181, 210/182, 184, 186, 187, 195.1, 199, 201, 202, 205, 257.1, 259, 295, 610, 606, 611, 612, 620, 631, 632, 614, 743, 746

[56] References Cited

U.S. PATENT DOCUMENTS

| | | | |
|---|---|---|---|
| 3,915,853 | 10/1975 | Luck | 210/606 |
| 4,018,650 | 4/1977 | Busta et al. | 210/611 |
| 4,192,918 | 3/1980 | Stineman et al. | 210/606 |
| 4,493,895 | 1/1985 | Colaruotolo et al. | 210/610 |
| 4,666,606 | 5/1987 | Heinicke | 210/632 |
| 4,861,471 | 8/1989 | Nakao et al. | 210/182 |
| 4,931,176 | 6/1990 | Guinard | 210/195.1 |
| 5,124,033 | 6/1992 | Ohmi et al. | 210/181 |
| 5,196,113 | 3/1993 | Metz | 210/181 |
| 5,200,085 | 4/1993 | Rudolf et al. | 210/181 |
| 5,506,096 | 4/1996 | Helmo | 210/606 |
| 5,512,178 | 4/1996 | Dempo | 210/182 |
| 5,531,897 | 7/1996 | Stormo | 210/606 |

*Primary Examiner*—Thomas G. Wyse
*Attorney, Agent, or Firm*—Baker & McKenzie

[57] ABSTRACT

A process and system for waste water treatment including a concentration means positioned at the front of the treatment system in order to concentrate the starches and sugars contained in a waste stream. In a mixing vessel, the concentrate stream is treated with a variety of additives in order to increase consumption of the biological components and to produce a stream having a predictable and predetermined level of soluble starches. The waste stream is solubilized by subjecting the stream to heat and enzyme treatment such that the starches and complex sugars are converted to simple sugars. In a fermentation vessel, a carefully selected yeast strain is introduced into the waste stream and permitted to feed on the sugars. The operating conditions in the vessel (e.g. pH, temperature, oxygen supply, and mineral supply) are carefully controlled to enhance consumption of the biological components in the waste stream. The final product is a marketable grade yeast and a clean water stream for environmentally safe disposal.

10 Claims, 2 Drawing Sheets

SYSTEM FOR WASTE WATER TREATMENT

This application is a divisional of U.S. Pat. No. 05,707, 524, issued Jan. 13, 1988 (application Ser. No. 08/603,042, filed Feb. 16, 1996.

BACKGROUND OF THE INVENTION

The present invention relates to an improved process and system for high strength organic waste water treatment. Specifically, the invention relates to a novel process and system for processing the high strength waste water streams issuing from a variety of primary facilities including food processing plants (e.g. potato, rice, grain processing), brewery plants, dairy processing, pharmaceutical plants, or the like in order to insure that the effluent discharge into municipal sewage systems and water ways is environmentally safe and free from harmful biological contaminants. The novel process and system of the present invention provides the additional function of producing a valuable single cell protein product having direct commercial use as animal feed and as a protein and flavoring supplement in human foodstuffs.

In most food, beer, dairy, or pharmaceutical processing facilities, there are waste water by-products that consist of water, soluble organics, and solid wastes. The waste water often includes an unacceptable level of biological waste products measured in terms of its Biological Oxygen Demand ("BOD"). Generally, the BOD level in an organic waste stream is directly related to the carbon content in the waste stream wherein the carbon is typically in the form of starch $(C_6H_{10}O_5)_n$, or sugar $C_6H_{12}O_6$. When an organic stream is injected into the environment, generally, and into a water body or ground water, specifically, aerobic bacteria use oxygen to degrade the complex organic compounds in the waste stream to simpler and environmentally neutral species such as $CO_2$, $NO_3^-$ ions, and $SO_4^{-2}$ ions. The organic compounds undergo a decomposition process driven by the available oxygen supply and that reduces the amount of dissolved oxygen in the water. When the carbon content of a waste stream is high (i.e. a high BOD level), anaerobic bacteria take over the decomposition process, forming rather noxious environmentally harmful pollutants including methane $CH_4$, ammonia $NH_3$, and hydrogen sulfide $H_2S$. Moreover, animal life can not survive in this environment because of the depletion of the oxygen supply in the water.

The BOD level of a water stream is determined by measuring the amount of oxygen consumed by a sample of known volume. The concentration of dissolved oxygen in the diluted sample is determined immediately and again after a period of five days. From the decreased oxygen concentration, a calculation of the BOD level in the water stream is made:

$$BOD = \frac{\text{No. mg } O_2 \text{ used in 5 days}}{\text{No. liters in sample}}$$

Generally, a BOD of 0 to 10 is characteristic of pure water. BOD values higher than 10, however, indicate water of doubtful purity. For example, untreated municipal sewage can have a BOD of 100 to 400 and some industrial wastes can have BOD values in the order of 10,000.

In the last decade, environmental concerns have altered the way waste water streams are dealt with in the industry. Of course, many Federal, State, and local regulations place strict controls on the nature of waste streams issued into the environment. Most municipalities require that an effluent contain less than 30 parts per million (ppm) organic species. Many solutions to the environmental concerns discussed above have been proposed.

One such proposal is directed to treating the volatile organic waste in the form of manure from the feedlot of cattle or other farm animals. As disclosed in U.S. Pat. No. 4,041,182 to Erickson et al., the first step comprises grinding or shredding the input materials to a course particulate size and subjecting the input materials to a biological decomposition using a broad spectrum enzyme complex capable of hydrolyzing the insoluble high molecular weight proteins and starches. Another step involves mechanical separation and dewatering of the non-volatile solids fraction of the raw materials (consisting mainly of cellulose and lignin). Erickson et al. discloses that the resulting material is subjected to an inoculating solution of synthesizing microorganisms. These microorganisms consist of single cell bacteria which undergo exponential growth. The Erickson et al. process essentially serves as a deodorizing plant that permits a portion of the by-product to be recycled back to the farm land.

The Erickson et al. use of a bacteria converting agent is problematic. First, many different bacteria strains are created in an unpredictable and uncontrolled process. Some of these bacteria strains can be very harmful and even deadly to humans, e.g. e-coli, and the different bacteria strains can cross-contaminate one another. As such, the biological by-product of the Erickson et al. process is not useful as a human food supplement nor as a livestock feed. Moreover, bacteria as an animal feed is less valuable than alterative additives such as yeast. Because bacteria is still in a complex protein form, it requires digestion by the animal as opposed to being a direct source of amino acids and growth nutrients. Bacteria is a low grade product unacceptable in most applications.

Similarly, U.S. Pat. No. 4,018,650 to Busta et al. discloses a waste treatment process using two different bacteria strains: Bacillus and Lactobacillus. The Busta et al. process is limited to streams containing both a protein source and a carbohydrate source. Moreover, the disclosed process utilizes a batch system which is not practical in most commercial applications. Burdensome set up procedures are required by forming a specified waste batch with a specified ratio of collagen and starch, again not practical in most commercial applications.

U.S. Pat. No. 4,617,123 to Christ offers an alternative treatment solution for a waste stream. Christ presents a process for treating the waste waters issuing from the manufacture of sauerkraut. Christ subjects the entire stream of waste water to a biological process utilizing an inoculum consisting of *Candid crusei* and *Candid utilis*. After the biological treatment, Christ treats the stream to a reverse osmosis in order to form a purified liquid effluent having a purity higher than 99%. Christ makes no provisions for controlling the yeast fermentation process including identifying pH levels and necessary control additives. The Christ process is further disadvantageous because it requires subjecting the entire waste stream to the biological process—a cost prohibitive feature in larger food processing plants. Although Christ discloses a preferred yeast type in the processing of sauerkraut waste, he makes no provisions for yeast selection in other classes of waste streams.

The difficulties and limitations suggested in the preceding are not intended to be exhaustive, but rather are among many which demonstrate that although significant attention has been devoted to waste treatment processes and systems, such methods and systems appearing in the past will admit to worthwhile improvement.

OBJECTS AND BRIEF SUMMARY OF THE INVENTION

It is therefore a general object of the invention to provide a novel process and system for waste water treatment which will obviate or minimize difficulties of the type previously described.

It is another general object of the invention to provide a novel process and system for waste water treatment which has direct commercial application as a final processing stage in stream line processing facilities including food processing plants, breweries, pharmaceutical plants and the like.

It is a specific object of the invention to provide a novel process and system for waste water treatment that includes a fermentation step and fermentation vessel, respectively, to produce a useful yeast by-product having direct commercial utility as a food additive or animal feed supplement.

It is another specific object of the invention to provide a novel process and system for waste water treatment that includes a fermentation step and fermentation vessel, respectively, for the yeast conversion of simple sugars in a carefully controlled biological process.

It is yet another specific object of the invention to provide a novel process and system for waste water treatment that minimizes the amount of waste water in the biological process thereby increasing the predictability and controllability of the biological process, and reducing the amount of additives required.

It is still another specific object of the invention to provide a novel process and system for waste water treatment that can be adapted for a variety of different kinds of waste streams.

BRIEF SUMMARY OF A PREFERRED EMBODIMENT OF THE INVENTION

A preferred embodiment of the invention which is intended to accomplish at least some of the foregoing objects comprises a process and system for waste water treatment including a concentration means positioned at the front of the treatment system in order to concentrate the starches and sugars contained in a waste stream. In a mixing vessel, the concentrate stream is treated with a variety of additives in order to increase consumption of the biological components and to produce a stream having a predictable and predetermined level of soluble starches. The waste stream is solubilized by subjecting the stream to heat and enzyme treatment such that the starches and complex sugars are converted to simple sugars. In a fermentation vessel, a carefully selected yeast strain is introduced into the waste stream and permitted to feed on the sugars. The operating conditions in the vessel (e.g. pH, temperature, oxygen supply, and mineral supply) are carefully controlled to enhance consumption of the biological components in the waste stream. The final product is a marketable grade yeast and a clean water stream for environmentally safe disposal.

DRAWINGS

Other objects and advantages of the present invention will become apparent from the following detailed description of a preferred embodiment thereof taken in conjunction with the accompanying drawings, wherein.

DETAILED DESCRIPTION

Figure 1:
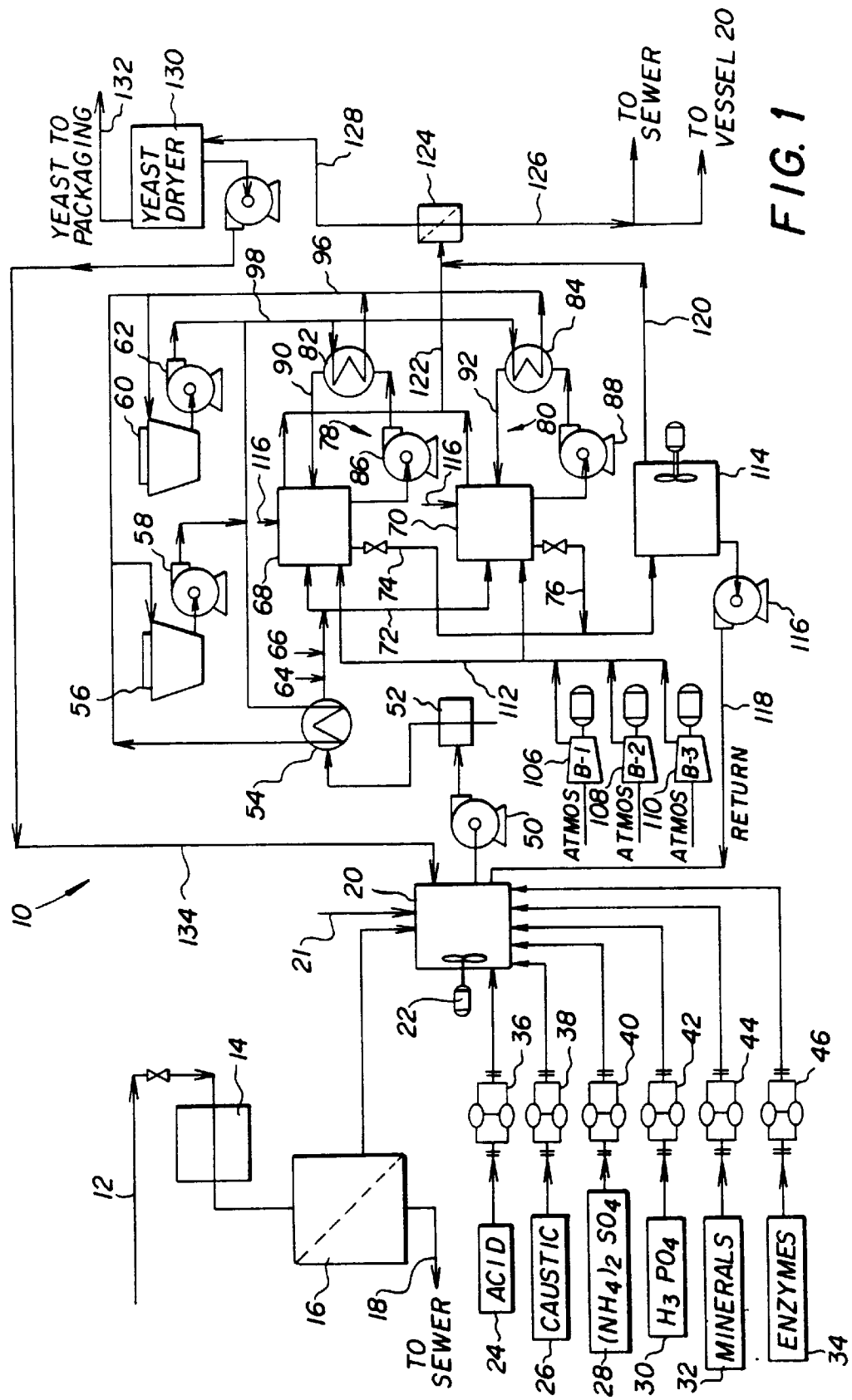
FIG. 1 is a schematic diagram showing the process and system for waste water treatment of the present invention.

Referring now to the drawings and particularly to FIGS. 1, there is shown a preferred embodiment of the process and system 10 for waste water treatment in accordance with the present invention. As shown, a waste stream 12 is issued from a primary processing facility (not shown), through appropriate piping, such as a food processing plant, brewery, dairy processing plant, pharmaceutical plant, or the like. Typical food processing plants well suited to operate in conjunction with the present invention are potato, rice, grain, and dairy processing plants and the like processing with an issuing waste stream heavy in organic compounds (e.g. starches and complex sugars). The specific rate of discharge will depend on the nature of the primary processing facility, but is typically in the order of at least 100,000 to 300,000 gallons per day.

The waste stream 12 will comprise a mixture of water, soluble and solid waste. The nature of the solid waste and the percentage solids in the stream 12 will again depend on the nature of the primary processing facility. Waste streams having a solid percent of 0.5% to 3.0% are common in the food processing industry. Also present in the waste stream are starch and complex sugar by-products in an amount that depends on the primary processing facility. These starch and complex sugar by-products are viewed by the primary facility as biological waste. Typically for food processing, the starch quantity is in the order of 0.5% to 3.0% and complex sugars is in the order of 0.2% to 1.5%. As discussed below, a waste stream comprising starches and sugars will produce a high quality yeast bio-mass. Such a high quality yeast bio-mass can not be economically produced with an inferior waste stream such as human and animal sewage.

The waste stream 12 is next directed to a holding tank 14 having a capacity commensurate with the flow rates of the stream 12. In operation, the specific BOD level of the waste stream 12 must be considered in order to properly implement the subject invention. In this regard, the BOD level can be maintained at a predictable and relatively consistent level by first directing the stream through a filtration unit 16 in order to concentrate the waste stream 12. Preferably, filtration unit 16 is one that performs ultrafiltration of the waste stream 12. Ultrafiltration is a process for separating dissolved materials (e.g. starches, sugars, etc.) as measured by their molecular size and shape. The ultra filter 16 is generally a fine filter comprising a selectively permeable membrane which retains macromolecules above a specified size while allowing the smaller molecules and solvent to pass though as a filtrate or permeate. Ultra filters 16 are available in a number of commercial configurations including spiral wound, hollow fiber and flat leaf systems. In the preferred embodiment, an ultra filter that retains molecules from 1,000 to 10,000 molecular weight is provided in order to insure the diversion of all the useful carbon constituents. In this way, the high BOD starches and sugars are retained while the environmentally clean filtrate 18 is directed to a municipal sewage system or returned to the primary facility for use therein as clean water. For example, a waste water stream 12 having 1.5% solids and 5,000 ppm BOD prior to ultrafiltration will have 18% solids and 30,000 ppm BOD after ultrafiltration.

The waste stream 12 is directed to a holding tank 20 having a mixing unit 22 of the type commercially available in the industry. Any commercially available mixing unit 22 commensurate in capacity with the flow rates of the stream 12 would be appropriate such as a two to five horsepower LIGHTNING brand mixer. In mixing vessel 20, the soluble BOD level of the stream 12 is adjusted to a level ideal for yeast growth and one that optimizes the consumption of the biological contaminants, preferably in the order of 4–5% soluble BOD. In this regard, a water supply line 21 and water return line 134 supply a ready source of water to the vessel 20. The water flow through lines 21 and 134 is controlled to provide the additional amounts of water necessary. A water line may also be provided from line 126 to vessel 20 as shown in FIG. 1.

In addition to controlling the level of soluble BOD components, a series of additives are injected into the holding and mixing tank 20, as necessary. The specific amount and types of additives will depend on the nature of the waste stream 12 as described below. A series of supply tanks 24, 26, 28, 30, 32, and 34 hold the additives which are selectively released into the holding tank 20 by corresponding metering pumps 36, 38, 40, 42, 44, and 46. Specifically, tank 24 holds an acid such as hydrochloric acid (HCl), sulfuric acid, or phosphorous acid for diversion into the tank 20 as a part of the pH control system and is metered by pump 36. Similarly, tank 26 holds a caustic such as sodium hydroxide (NaOH) or potassium hydroxide (KOH) for diversion into the tank 20 as a part of the pH control system and is metered by pump 38. Tank 28 contains a nitrogen source such as ammonia sulfate $((NH_4)_2SO_4)$ as required to enhance yeast growth for conversion of the waste stream and is metered by pump 40. Tank 30 contains phosphorus source such as phosphorous acid $(H_3PO_4)$ as required to enhance growth for conversion of the waste stream and is metered by pump 42.

Tank 32 contains a slurry of trace minerals provided to enhance the yeast growth process. An exemplary slurry contains nitrogen (10%), phosphorous (5%), potassium (1%), chromium (0.5%), and cadmium (0.2%) and is metered by pump 44. Of course, the specific components of the mineral slurry may vary depending on the nature of the stream 12 and the types of components added from other tanks. For example, the phosphorous acid $H_3PO_4$ supplied from tank 30 is a source of acid for pH control and a source of phosphorous for yeast growth enhancement. As such, a separate mineral supply of phosphorous from tank 32 may not be necessary. Tank 34 contains a liquefaction enzyme which serves to keep the starch rich stream issuing from the filtration unit 16 in a fluid form. The enzyme is a liquid enzyme of the alpha amylase class which also includes gluco amylase.

In the process and system of the present invention, the waste steam is subjected to testing and analysis using a sample drawn from the tank 20 or at another convenient upstream location. The testing and analysis identifies at least the following waste stream characteristics: (1) pH; (2) ppm of minerals including specific data for nitrogen, phosphorous, potassium, chromium, and cadmium; (3) soluble BOD percent; and (4) percent of suspended solids. Once the appropriate data is collected and evaluated, the relevant metering pumps are 36, 38, 40, 42, 44, and 46 are activated in order to selectively supply the holding tank 20 with the required additives. The metering pumps may be manually activated in response to input data or may be configured to automatically respond to input signals from electronic measuring and testing apparatus. Once the required amounts of specific additives are determined, the control valves may be set at the appropriate position for continuous issuance of the additives stored in tanks 24, 26, 28, 30, 32, and 34 into mixing tank 20.

After any adjustments to the waste stream 12 are made, the stream 12 is issued from tank 20 under the control of pump 50. The stream 12 is next directed toward jet cooker or similar heating unit 52 to commence a solubilization process. The jet cooker heats the stream 12 up to a temperature sufficient to break up the starches in the stream 12 and to sterilize the waste stream prior to its introduction into the fermentation vessels (e.g. in the order of 250° F.). After exiting the jet cooker 52, the stream 12 passes through a heat exchanger 54 that cooperates with cooling tower 56. In the heat exchanger 54, the stream 12 is cooled to a temperature in the range of 90 to 98° F., preferably about 95° F., in order to optimize the rate of yeast growth. At temperatures substantially above and below 95° F. the rate of yeast growth in fermentation vessel 68 would propagate at a reduced and undesirable rate. A pump 58 controls the fluid flow exiting the cooling tower 56. In the preferred embodiment, the system 10 is provided with a second cooling tower and associated control pump 62 that interacts with heat exchangers 82 and 84 as discussed below. A second heat exchanger is particularly useful during the summer period where additional cooling capacity may be necessary.

A yeast stream 64 is directed into stream 12 just prior to the introduction of the stream 12 into the first fermentation vessel 68. The flow volume of the yeast stream 64 is dependant on the flow volume and characteristics of the waste stream 12. Generally, however, yeast stream 12 is introduced into the fermentation vessel in quantities in a range of about 3% to 8%, preferably in the order of 6 to 7% of initial volume. Once the initial supply of yeast 64 is provided during set up operations, yeast growth will perpetuate in the fermentation vessels 68 and 70. Similarly, an enzyme stream 66 is introduced prior to the introduction of the stream 12 into the first fermentation vessel 68. The enzyme 66 is a saccrifation enzyme that modifies the starch components of the stream and converts all of the starches in the stream to glucose. If the waste stream 12 is derived from a barley, rice, or grain processing facility, then the enzyme 66 is preferably alpha amylase or gluco amylase type. If the waste stream 12 is derived from a dairy processing facility, the preferred enzyme 66 is lactase. The enzyme is introduced in quantities in a range of about 0.1% to 0.5%, preferably in the order of 0.3%. The combined stream 12 is next directed to the first fermentation vessel 68.

Fermentation vessel 68 is sized and configured to optimize the fermentation process (i.e complete consumption of the soluble BOD). The vessel preferably has a height in the order to 26 feet and a diameter in the order of 20 feet, with the particular dimensions depending on the flow volume of the stream 12. On average, a given sample of waste stream 12 should flow through the vessel 68 for about 12 to 20 hours in order to completely convert the glucose into yeast mass. Line 72 connects vessel 68 to a second line fermentation vessel 70 as shown. Vessel 70 serves as a secondary fermentation vessel to be utilized when high flow volumes are experienced or when the first vessel 68 is off line (e.g. for routine maintenance or to flush the vessel, via line 74, if a process batch becomes contaminated).

Each fermentation vessel 68 and 70 is provided with a heat exchange loop 78 and 80, respectively, in order to control the operating temperature in the vessels 68 and 70. The loops comprise a heat exchanger 82 and 84, respectively, and an associated pump 86 and 88 to control the withdrawal of a stream from the vessels 68 and 70 as needed. Specifically, if the vessel temperature increases substantially above 95° F., the appropriate pump 86 or 88 is activated and a withdrawn stream is circulated through heat exchanger 82 or 84 back to vessel 68 or 70 via line 90 or 92. The heat exchangers 82 and 84 cooperate, via lines 96 and 98, with a cooling tower 56 and/or 60 in order to provide a steady source of cooling water.

As is well known in the art, in order for the yeast fermentation process to occur in the vessels 68 and 70, a readily available supply of oxygen in the vessels must exist. In this regard, compressors 106, 108, and 110 are activated as necessary in order to supply air to the vessels 68 and 70 through supply line 112. Air should be supplied at a pressure between 12 and 15 psi, preferably at 13 psi, in order to insure complete supply of oxygen. The particular pressure depends on the size of the fermentation vessels 68 and 70. The pressure is supplied through a fine bubble diffuser in order to insure the formation of fine bubbles in the vessel to enable consumption by the yeast cells. It is important to keep the oxygen supply to the vessels because, without oxygen, the yeast will produce alcohol in an anaerobic process.

An additional control parameter in the fermentation vessels 68 and 70 is the pH of the vessel contents. Generally, bacteria can not exist in an environment having a pH less than 4.0. If the pH in the vessels 68 and 70 is maintained at levels above 4.0, bacteria will grow in the mass resulting in a complete loss of the batch and requiring recycling as discussed below. In order to control pH, a supply of acid and caustic substances is introduced into the vessels 68 and 70 through supply lines, schematically illustrated as line 116 in FIG. 1. Preferably, a line runs from acid supply tank 24 and a line runs from caustic supply line 26 into the vessels 68 and 70. The acid may be any known type such as hydrochloric acid (HCl), sulfuric acid, or phosphorous acid. Similarly, the caustic may be of any known type such as sodium hydroxide (NaOH) or potassium hydroxide (KOH). In the preferred operation, the pH level is controlled to remain below 3.8.

If a bacteria strain should develop in the fermentation vessel or the batch is otherwise defective, the appropriate vessel 68 or 70 should be flushed through line 74 or 76, respectively, and its contents diverted to storage vessel 114. At this point, the batch may be redirected, via line 118, back to mixing tank 20 for further processing. A pump 116 controls the fluid flow through line 118 as indicated. In an alternative embodiment, vessel 114 serves as an additional fermentation vessel with associated cooling loop (not shown) with flow line 120 to ultra-filter 124.

During the fermentation process, a produced yeast biomass is withdrawn from the vessels and directed, via line 122, to an ultra-filter 124. The resulting stream flows through an ultra-filter 124 whereby a clean water stream is directed through line 126 to a sewer for safe disposal or back to the adjustment vessel 20 as shown. A yeast stream is directed to a dryer 130 via line 128. Any commercially available spray dryer 130 is suitable such as the NIRO or SWENSON brand spray dryers. The dry yeast product is then directed, via line 132 to an appropriate packaging facility (not shown). The water by-product is directed back to adjustment vessel 20, via line 134, in order to provide the necessary water addition to bring the waster stream to its optimal soluble BOD level.

Figure 2:
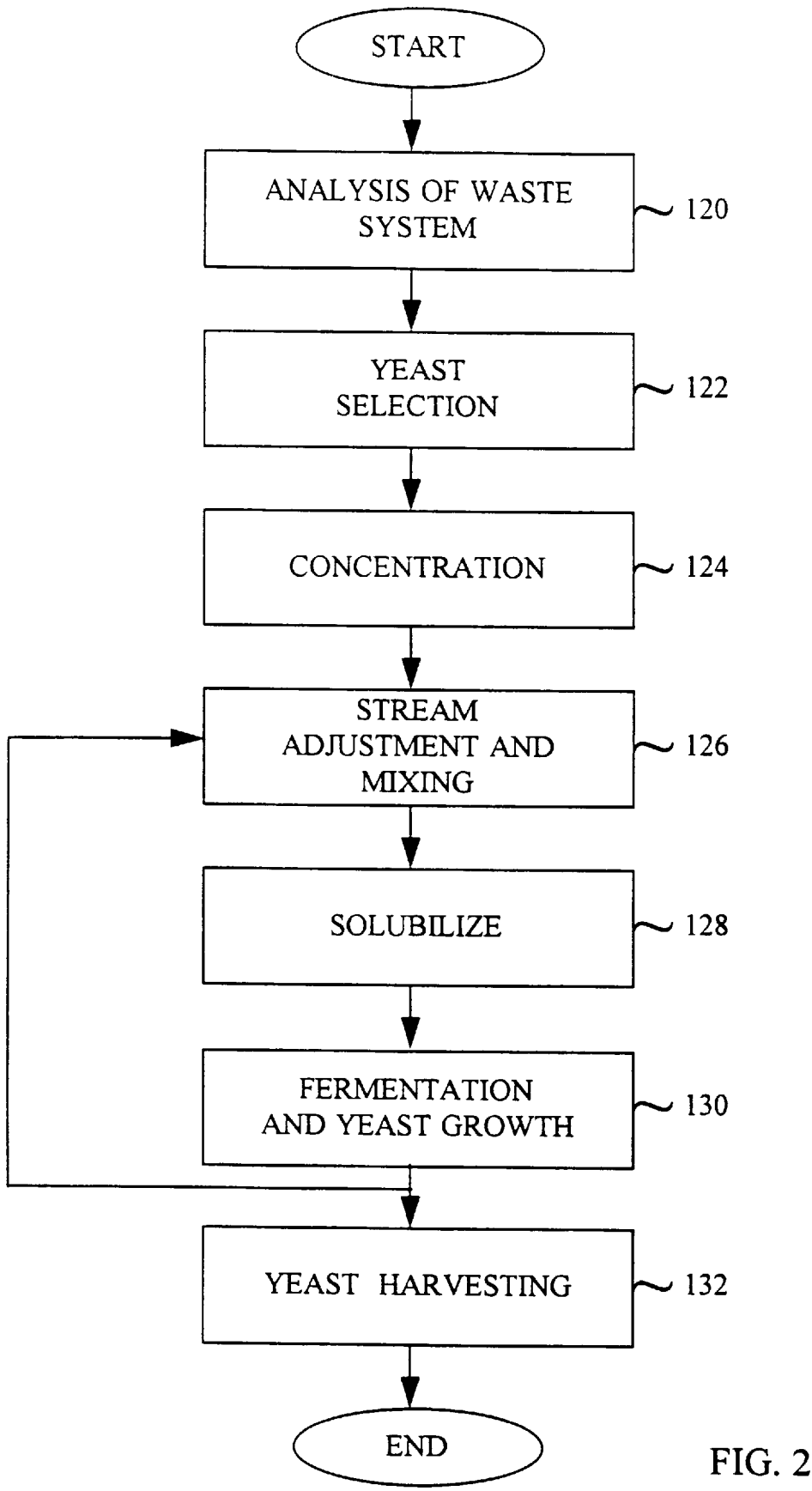
FIG. 2 is a flow diagram depicting the novel sequence of steps of the process for waste water treatment of the present invention.

The treatment process of the preferred embodiment is now described with reference to FIG. 2. The first step 120 in the treatment process is to analyze the waste stream 12 of the primary facility. It is the characteristics of this stream that determines the specific parameters of the inventive process. Of course, the primary focus is on the nature of the stream 12. For example, if the primary facility is a potato processing plant, a very high degree of soluble starch, and thus BOD, content should be expected in the flow stream (e.g. 30 ppm). Also important is the flow rate of the stream 12 issued from the primary facility. Typical flow rates for food processing plants are in the order of 200 gallons per minute.

The second step in the inventive process is the yeast selection step 122. This step depends on the results of the analysis step 120. Specifically, the particular yeast strain used in the process depends on the form of the BOD issuing from the primary facility. Table I below is intended to summarize the preferred yeast strains as a function of the product processed in the primary facility.

TABLE I

| PRIMARY COMPONENT OF WASTE STREAM | PRIMARY PROCESS | EXAMPLES OF YEAST STRAINS(S) |
|---|---|---|
| Starches | Potato and rice processing | *Candida utilis* |
| Whey | Dairy and cheese processing | Kluyveromyces yeast including *fragilis* or *marxianus* |
| Grain Solubles | Barley, wheat and oats processing | Saccharomyces genus; *Candida utilis* |

One skilled in the art will recognize the proper yeast selection and Table I is only intended to be an exemplary tabulation.

The third step is the concentration step 124. Preferably, the concentration is an ultrafiltration of the primary stream 12 wherein the soluble BOD components are retained. Specifically, soluble particles having a molecular weight of approximately 1,000–10,000 or greater are retained while the smaller particles and fluid stream is permitted to pass (note line 18 in FIG. 1). The concentration step is a significant improvement over prior art methods. First, the concentration step diverts the water issuing from the primary facility as a clean water stream 18. In this regard, only a relatively low volume waste stream must be treated in the process such that the required system components (e.g. fermentation vessels) are less complex, smaller in size, and less costly. Furthermore, the concentration step permits the process of the present invention to be adapted to most primary processes without regard to specific BOD levels. In the preferred process, the waste stream entering the fermentation vessels 68 and 70 has a soluble BOD level of 4 to 5 percent (i.e. 40,000 to 50,000 parts per million). This represents a sufficient concentration of particles for consumption by the yeast on the one hand, but not too high in concentration so as to require an unworkable demand of oxygen and other minerals during the fermentation process. With the concentration step, any waste stream can be first concentrated, then brought to an ideal level of soluble BOD in a downstream vessel, such as vessel 20. In this regard, the operator can determine the precise BOD level and accommodate the process parameters accordingly in a predictable and reliable manner.

The stream adjustment and mixing step 126 comprises adjusting the soluble BOD level, the mineral content, and pH levels of the stream 12. First, the stream is brought to its ideal soluble BOD level (e.g. 4–5% BOD) by adding water. Once this level is achieved, mineral content and pH levels can be modified with accuracy and reliability. Generally, for every 100 lbs. BOD, the stream should comprise 7 lbs.

nitrogen, 5 lbs. phosphorous, 2 lbs. potassium, 0.5 lbs. chromium, and 0.3 lbs. cadmium. The stream 12 may already consist of the proper levels of minerals, thus making unnecessary the injection of additional minerals. As a part of the stream adjustment and mixing step, a liquefaction enzyme such as alpha amylase is added to the stream to insure that the stream is maintained in fluid form. After the appropriate additions are made to the stream, the stream is mixed in a vessel, such as tank 16 in FIG. 1.

The stream is next solubilized in step 128. Specifically, the stream is heated to a temperature which serves to break up the starch particles into smaller pieces and to sterilize the waste stream (i.e. kill all the bacteria in the stream). A temperature in the order of above 250° F. is suitable. After the stream is heated, it is cooled to a temperature in the range of 90 to 98° F., preferably 95° F. by directing the stream through an appropriate heat exchanger, such as heat exchanger 54 of FIG. 1. The next phase in the solubilization step is the addition of a saccrifation enzyme to convert the starch particles into simple sugar. The particular type of enzyme depends on the nature of the waste stream 12. For example, in most starch streams (e.g. rice, grains, potato processing), gluco amylase is injected into the waste stream at a ratio of 0.1 lbs per 100 lbs. BOD.

In the fermentation step 130, the waste stream is directed to a fermentation vessel, for example, vessel 68 or 70 shown in FIG. 1. The yeast strain(s) selected in step 122 is injected into the vessel along with the waste stream. Generally, the yeast ratio should be in the order of 3% to 8%, preferably 6% to 7%, of the initial waste stream contained in the vessels 68 and 70. As discussed above, a steady and reliable supply of oxygen is introduced into the fermentation vessel and percolates through the bio-mass in the vessel. As the yeast feeds on glucose contained in the waste stream, it reproduces into a single cell protein bio-mass. The yeast growth proceeds for a period of 10–20 hours until complete consumption of the soluble BOD content is achieved. During the growth process, the fermentation variables are carefully controlled including mineral content and pH levels as discussed above. Moreover, the stream temperature is carefully controlled in a range of 90 to 98° F., preferably 95° F., in order to control yeast growth. The yeast stream is then withdrawn from the fermentation vessel at a continuous rate for further processing. As shown in FIG. 2, in the event that the final product of the fermentation process is defective (e.g. bacteria growth, alcohol production, etc.), the contents of the vessel are withdrawn and redirected back to the stream adjustment and mixing step 126.

The yeast harvesting step comprises introducing the yeast stream to a filtration process, preferably ultrafiltration. In this process, the yeast bio-mass is captured and diverted to a yeast dryer and a water by-product is directed, through line 134, to adjustment vessel 20. The filtrate is directed, through line 126, to a sewer or back to vessel 20 as a clean water flow having organic levels below 30 ppm.

The invention will now be described in terms of an example that is provided in order to better elaborate and describe the invention and in no way should be understood to limit the scope thereof.

EXAMPLE I

Waste Stream
Waste Stream Flow=Q=300,000 gal./day=210 gal./min.
Soluble Starch=16,000 ppm or 40,000 lbs./day
Ultrafiltration
permeate=90% of Q=189 gal/min. with 5% or 2000 lbs. of the total soluble starch to sewer or reuse by primary facility concentrate=10% of Q=21 gal./min. with 95% or 38,000 lbs. of the total soluble starch
Solubilization
Waste stream is heated to a temperature in the order of 250° F.,
After cooling the stream to a temperature of approximately 95° F., a gluco amylase enzyme is added to the stream, prior to entry into the fermentation vessel, in a quantity of 0.3%.
Fermentation and Yeast Growth
Two Fermentation vessels with $Q_f$=10.5 gal./min. with 19,000 lbs. sugar.
Air supply each vessel=19,000 lbs. (1 lb. for each lb. of yeast)
Temperature maintained in each vessel at 95° F.
Feed stream is retained in and constantly feed through the vessel approximately 10–20 hours and withdrawn from the vessels at 64 gal./min. or 26,000 lbs. yeast cream. Approximately ⅓ of the soluble BOD is used to produce $CO_2$ and Heat.
Yeast Harvesting
Direct 21 gal/min. stream through 10,000 molecular weight membrane.
Flow permeate=16.8 gal./min. or 183 lbs. unharvested protein and broken yeast to sewer for safe disposal
Flow Yeast stream=4.2 gal./min. or 25,817 lbs. yeast to dryer with excess water to vent.

SUMMARY OF MAJOR ADVANTAGES OF THE INVENTION

After reading and understanding the foregoing detailed description of a process and system for waste water treatment in accordance with preferred embodiments of the invention, it will be appreciated that several distinct advantages of the subject process and system for waste water treatment are obtained.

Without attempting to set forth all of the desirable features of the instant process and system for waste water treatment 10, at least some of the major advantages include providing a means for directing a waste water stream 12 from a primary processing facility through a concentration means 16 in order to concentrate the soluble starches and complex sugars. A treatment means 20 and 24–46 provides for analysis and treatment of the concentrated waste stream 12 including soluble BOD level adjustment, pH control, mineral adjustment, and enzyme addition. The waste stream 12 is subjected to a solubilization process 128 in which the waste stream 12 is directed through a heating means 52 that breaks up the soluble starches and sterilizes the stream. The process and system 10 includes introducing the waste stream 12 into a fermentation vessel 68 or 70 in which the stream 12 is mixed with a selected yeast strain. In the novel process and system 10 of the present invention, the fermentation parameters are carefully controlled to permit optimal yeast growth while avoiding bacteria strains and pollutant by-products. The final product is a marketable grade yeast stream 132 and a clean water stream 126 for environmentally safe disposal.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which fall within the purview of the subject invention.

What is claimed:

1. A system for treatment of waste water stream comprising soluble biological contaminants issuing from a primary facility, said system comprising:

a waste water filtration unit that divides the waste water stream into a permeate stream and a concentrate stream such that the concentrate stream comprises a concentrated mixture including the soluble biological contaminants and water;

a holding vessel in fluid communication with said waste water filtration unit, said holding vessel receiving the concentrate stream from the waste water filtration unit;

a stream heating unit in fluid communication with said holding vessel, said stream heating unit increasing the temperature of the concentrate stream exiting said holding vessel;

at least one fermentation vessel in fluid communication with said stream heating unit, said at least one fermentation vessel receiving the concentrate stream and a quantity of active yeast;

at least one pressure means in fluid communication with said at least one fermentation vessel, said at least one pressure means directing pressurized air into said at least one fermentation vessel; and a second filtration unit in fluid communication with said at least one fermentation vessel, said second filtration unit filtering a yeast mass withdrawn from said at least one fermentation vessel into a water stream and a yeast product stream, whereby the treatment system substantially converts a waste water stream issuing from a primary facility into a relatively clean water stream and a useful yeast product.

2. A system for treatment of a waste water stream as defined in claim 1 further comprising:

a heat exchanger in fluid communication with said stream heating unit and said at least one fermentation vessel, said heat exchanger cooling the concentrate stream exiting from said stream heating unit.

3. A system for treatment of a waste water stream as defined in claim 1 further comprising:

a heat exchanger operably associated with each of said at least one fermentation vessels for maintaining the fermentation vessel contents at a predetermined temperature.

4. A system for treatment of a waste water stream as defined in claim 1 wherein said waste water filtration unit is configured to perform ultra filtration of the waste stream.

5. A system for treatment of a waste water stream as defined in claim 1 wherein said stream heating unit is an in-line jet cooker.

6. A system for treatment of a waste water stream as defined in claim 1 further comprising:

a plurality of storage vessels for storing stream adjustment substances, said plurality of storage vessels operably associated with said holding vessel.

7. A system for treatment of a waste water stream as defined in claim 6 wherein said plurality of storage vessels comprise separate vessels that contain an acid substance, a caustic substance, and a liquefaction enzyme.

8. A system for treatment of a waste water stream as defined in claim 7 further comprising:

a water supply line in fluid communication with said holding vessel for supplying water to said holding vessel.

9. A system for treatment of a waste water stream as defined in claim 1 further comprising a waste water holding tank in fluid communication with said waste water filtration unit, said waste water holding tank being positioned prior to said waste water filtration unit.

10. A system for treatment of a waste water stream as defined in claim 1 further comprising:

a water return line providing fluid communication between said second filtration unit and said holding vessel to divert said water stream back to said holding vessel.

* * * * *